Jan. 9, 1968            W. B. WILKINS            3,362,867
LADING PALLET OF LAMINATED CONSTRUCTION
Filed July 6, 1964            3 Sheets-Sheet 1
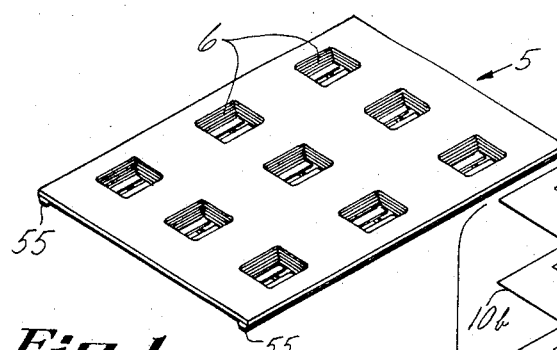
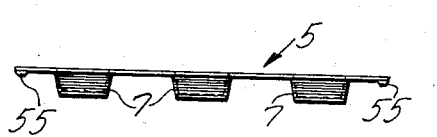
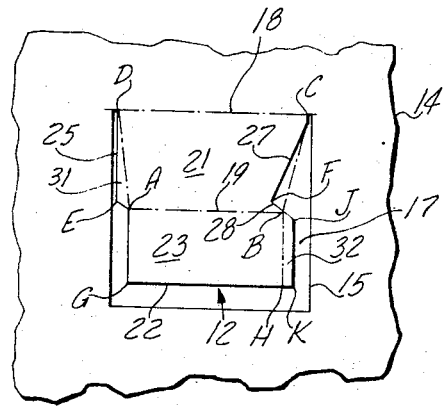
INVENTOR.
WILLIAM B. WILKINS
BY
ATTORNEY Jan. 9, 1968  W. B. WILKINS  3,362,867
LADING PALLET OF LAMINATED CONSTRUCTION
Filed July 6, 1964  3 Sheets-Sheet 2

INVENTOR.
WILLIAM B. WILKINS
BY
Henry Kozak
ATTORNEY

Jan. 9, 1968      W. B. WILKINS      3,362,867
LADING PALLET OF LAMINATED CONSTRUCTION
Filed July 6, 1964      3 Sheets-Sheet 3

INVENTOR.
WILLIAM B. WILKINS
BY

*ATTORNEY*

United States Patent Office 3,362,867
Patented Jan. 9, 1968

3,362,867
LADING PALLET OF LAMINATED
CONSTRUCTION
William Burdette Wilkins, Roxboro, N.C., assignor,
by mesne assignments, to Midland-Ross Corporation, Cleveland, Ohio, a corporation of Ohio
Filed July 6, 1964, Ser. No. 380,230
13 Claims. (Cl. 161—110)

ABSTRACT OF THE DISCLOSURE

A laminated lading pallet having integral downward protruding bosses for supporting the main lading platform of the pallet in spaced relation with a floor or other base. The bosses are spaced to permit entry therebetween of fork-lift tangs or other lifting media and comprise bonded pre-cut tabs of the laminae.

Lading pallets are commonly constructed in the form of a grid work of lumber and are used advantageously to enable a load placed thereon to be lifted and carried elsewhere by a lift truck, crane or other lifting device. Such pallets are in common use for small commercial shipments of heavy articles. Though wooden pallets entail substantial expense, they are not re-usable insofar as they may be returned for new shipments because of the expense of shipping that their weight and bulk entail.

The present invention also contemplates the supplanting of wooden pallets in industrial use wherein the pallets serve for room-to-room or shop-to-shop transportation of raw materials, and partly finished or completed products. However, in this use there are disadvantages since, e.g., wooden pallets have limited service life because of a tendency of nailed joints to become loose, and because of their inability to be compactly stored.

It is a general object of the invention to provide lightweight high-strength lading pallets including supporting bosses or legs thereof which are constructed of superimposed sheets of laminating material.

It is an object to provide lading pallets which are free from joints requiring fasteners, connectors, and the like in order to avoid deterioration due to loosening of one component of the pallet with respect to another.

An important object also is to provide an article of sheet material which is adapted for use as a pallet-forming element and, when combined with a plurality thereof and conformed to a desired shape, comprises an integrated portion of such pallet.

A further object is to provide a lading pallet including one or more supporting bosses substantially all of which is of laminated construction adapting the pallet for nesting or stacking with a plurality of similar pallets in compact superimposition thereby rendering it economical for such pallets to be shipped in commerce, or to be used for shipping purposes and returned empty.

It is also an object to provide lading pallets which are of low cost and readily manufactured in a variety of sizes and capacities.

The invention resides, in the first instance, in an article of flexible sheet material, e.g., a stamping of paper or sheet metal, cut out along a precise pattern of one or more polygonal boundaries to define a boss-forming tab within each boundary. Each tab has a base fold-line along its respective boundary with the pattern of boundaries accurately reproduced on a plurality of said sheets but the tabs occurring in different orientations relative to respective boundaries from sheet to sheet. Each tab comprises a side wall section nearest the base line and a distal cap-wall section enabling the tabs of all superimposed boundaries when properly shaped and bonded together, to constitute the side walls and cap-wall of a frusto-pyramidal boss projecting beyond a base plane portion of a laminated panel.

In a preferred form of the invention a lading pallet comprises a plurality of such articles cut out in a multi-tabular pattern, superimposed, shaped, and bonded together to provide frusto-pyramidal bosses extending from the base plane portion of the pallet or panel.

In the drawing with respect to which the invention is described:

FIG. 1 is a perspective view of a panel or pallet in accordance with the invention.

FIG. 2 is an exploded view of perforated sheets constituting the panel of FIG. 1.

FIG. 3 is an end elevation of the pallet of FIG. 1.

FIG. 4 is an enlarged fragmentary view of a tabular area from one of the sheets of FIG. 2.

FIG. 5 is a perspective view of superimposed fragments of eight sheets such as shown in FIG. 2 with the tabs of superimposed tabular areas folded and interlaced to illustrate formation of a boss.

FIG. 6 is a fragmentary plan view illustrating a portion of the pallet of FIG. 1.

Figure 7:
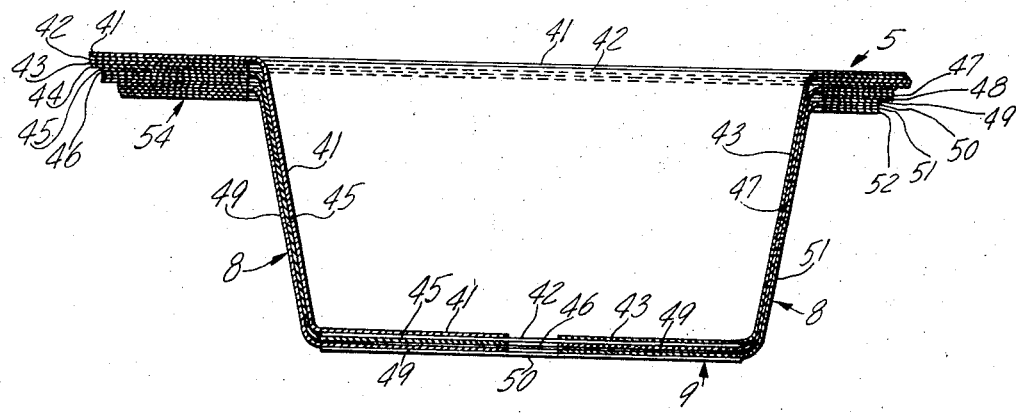
FIG. 7 is a fragmentary elevation in section of a pallet boss taken along line 7—7 of FIG. 6.

FIG. 1 is a top-side perspective view of a multiple boss panel 5 useful, for example, as a lading palette. Visible in this figure are nine depressions 6 formed by bosses 7 shown in FIG. 3. The bosses 7 are frusto-pyramidal in shape and have side walls 8 and a bottom or cap wall 9, as shown more clearly in FIG. 7.

The panel 5, including its bosses 7, is of laminated structure and comprises a plurality of specially cut sheets or laminae 10a, 10b, 10c, 10d, 10e, 10f, 10g, and 10h and such additional sheets as deemed necessary. The minimum number of sheets or laminae is determined by the number of sides in one of the frusto-pyramidal bosses. For preferred construction of the boss, the minimum number of sheets is double the number of side walls; that is to say, if the boss has four side walls there should be at least eight sheets of lamini with the tabs 12 of each pair of 4 pairs of sheets oriented in one of four different directions. The tabs of each pair will occupy or close in one side of a boss but are reversed with respect to corners of the boss along each upward extending edge of a side wall so that one set of four tabs overlap the joints between the tabs of another set of four tabs in a manner further described herein.

In FIG. 2, sheets 10a to 10h may be assumed to be in exact vertical alignment and registry. This being so tabular areas 14a to 14h and 14d provide polygonal boundaries 15a to 15h, respectively, which are in exact vertical registry, although the tabs 12 thereof extend in four different directions corresponding in number with the four sides of the polygonal boundaries. The sheets 10a to 10h are each cut out in accurately matching patterns to provide a similar group of polygonal boundaries in vertical registry throughout the group of sheets for each polygonal boundary of each sheet.

When the sheets are tightly superimposed, the tabs of all superimposed boundaries will fold into a common recess 6 shown in FIG. 1 to interlace and overlap one another somewhat as shown in FIG. 5.

FIG. 5 is provided in the drawing to illustrate the principle involved in forming any one of the bosses 7 and while it illustrates an arrangement that may be obtained manually, it does not truly represent any condition reached in the use of male and female platens used to form the product illustrated in FIG. 1.

To better understand the formation of the boss 7, the details of construction of the tabs 12a to 12h should be noted. In FIG. 4, the tabular area 14, the polygonal boundary 15, and the tab 12 are exemplary of those hereinbefore named in connection with sheets 10a to 10h and are directly analogous to the same features of these sheets. The tab 12, as shown, is that portion of the material of the parent sheet remaining out of the polygonal boundary 15 after the sheet is subjected to stamping or other cutting procedure to cut out an open area 17 between the tab and the boundary 15. The base fold-line 18 is substantially coextensive with one straight portion of the boundary 15 which, in this case, is of rectangular and approximately square outline. The tab has another fold-line 19 which is necessarily parallel to the fold-line 18. Disposed between the two fold-lines is a side wall forming section 21 of the tab. This section and superimposed tab sections of other similarly cut sheets will form one side wall of a boss 7. Disposed between the fold-line 19 and the distal edge 22 of the tab is a cap-wall forming section 23 of the tab.

In order to understand the participation of the tabs 12a to 12h in the formation of strong bosses, some details of the tab construction should be especially noted. In FIG. 4, fold-line 19 extends from point A to point B. Points A and B occur in the finished boss at the dihedral corners formed by the cap-wall 9 and the side walls 8. A to B is the distance along one side of the cap wall. Thus, the outline of one side wall is represented by the area A, B, C, D. However, it will be noted that the lateral edge 25 of section 21 adjacent the line AD lies outside the actual area of the side wall represented by area A, B, C, D. Line AD is a fold-line which extends along the apex of the dihederal angle between two adjacent side walls of a boss. The area ADE projecting beyond line AD extends through the dihedral angle of two adjacent side walls into the adjoining side wall. However, in order that there is not an over-thickness in the side walls adjacent the corners caused by overlapping of the tab in adjacent side walls, all tab sections 21 are indented laterally inwardly from the true side wall area ABCD along lines 27 and 28. Thus, the cut-out area BCF accommodates the flap area ADE of the tab extending through the corner containing the line BC.

In order to strengthen the boss along dihedral corner portions joining each side wall and the cap-wall, the cap-wall sections 23 are cut oversize to provide slight overlap with the side walls. Observing FIG. 4 again, the area ABHG of the cap-wall section 23 is that which actually occupies the cap-wall. Line BH extends between that area of the section 23 which normally occupies the cap-wall and area BHKJ which extends into the side wall. For shorter indication purposes of illustration, flaps AED and BJKH are given numerals 31 and 32, respectively, and indicated as such in FIG. 5. These flaps are shown in an out-of-normal condition wherein they project beyond the adjacent walls. In normal pressing operations they merge into the walls of the boss without being so extended.

Figure 5A:
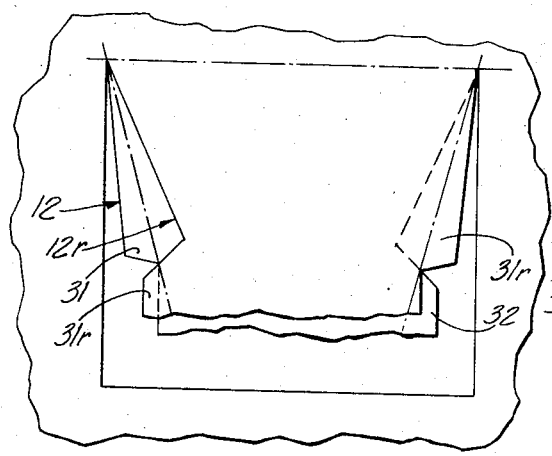
FIG. 5a is a fragmentary view of superimposed boss-forming tabs of which one is reversely cut with respect to the other.
Figure 9:
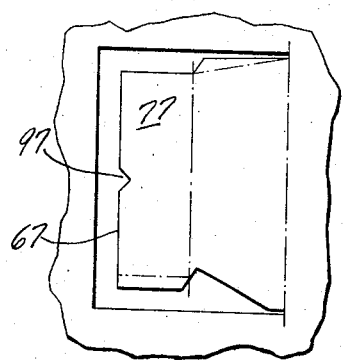
FIGS. 9, 10, 11, 12 illustrate tabular areas from component laminae or perforated sheets or a panel having bosses illustrating the orientation of respective tabs of the areas to be placed in superimposition.
Figure 12:
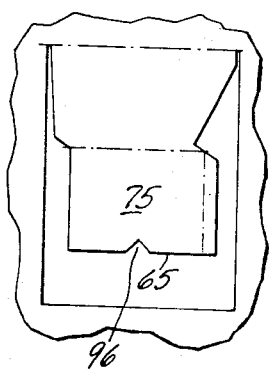

FIG. 6 illustrates a flap 31 which is exemplary of the similar flaps of tabs 12a to 12h which extend through the dihedral corners formed by walls 8 and thus reinforce the corners. As shown in FIG. 2, the tabs 12e to 12h are reverse cut with respect to tabs 12a to 12d. To illustrate this difference, FIG. 5a is provided. As shown therein, the flap 31r, which typifies the flaps which are a part of respective side wall sections of tabs 12a to 12d, is on the side of its respective tab 12r opposite from that of flap 31 of the tab 12 shown in underlying or superimposed relation with the tab 12r. It should now be apparent that the flaps of tabs 12a to 12d, when subjected to the action of boss-forming molds, will extend in counterclockwise direction relative to the periphery of the boss to make joints in the adjacent counterclockwise disposed side walls, whereas the flaps of tabs 12e to 12h project in a clockwise direction. Flaps of this latter group will extend into clockwise-disposed adjacent side walls to form joints therein with other tabs that are out of superimposed registry with the joints formed by tabs 12a to 12d.

FIG. 6 also illustrates the manner in which the cap-wall sections of the tabs are cut purposely short of the dimension which would cause them to meet or overlap at the center of the cap-well. Consequently, tabs extending from opposite directions within the boss have a gap 33 between respective distal edges. When this mode of cutting is carried out in four directions, the result is an opening 34 which is usually desired for drainage.

While eight laminating sheets, such as sheets 10a to 10h are a preferable minimum that may be used for a panel of the type exemplified by panel 5, thus panel 5 is illustrated in FIG. 7 as having 12 sheets. Obviously, bosses of approximately balanced cross section are obtained when the number of laminae is a full number multiple of the number of side walls of FIG. 2. In panel 5, as shown in FIG. 7, the laminae are numbered 41 to 52 and are traced to the extent distributed within (1) the planate base or platform 54, (2) the side walls 8, and (3) the cap wall 9. The main purpose of FIG. 7 is to demonstrate that each tab can only participate in the forming of one out of the four sides of the boss. Hence, the side walls of the boss will only have one-fourth as much laminating material in them as the platform portion 54 of the panel. On the other hand, each tab will participate in forming of the cap-wall 9 in accordance to the length to which it is cut. As shown, the cap-wall sections of the tabs are less than one-half the width of the cap-wall. Consequently, in most of the area of the cap-wall, the thickness will be approximately one-half that of the base or platform portion of the panel on account of the fact that only one-half of the cap-wall sections of the tabs become superimposed. Exceptions to this are the opening 34 and the narrow corridors extending radially in four directions from the opening 34, as shown by FIG. 6, which are bridged by only 3 laminae. This is demonstrated in FIG. 7 which shows laminae 42, 46 and 50 exposed within the opening 34. Thus, with tabs cut to leave an opening such as opening 34, the side walls 8 are approximately one-fourth thickness, and the cap wall 9 is approximately one-half the thickness of the planate platform portion 54.

Figure 8:
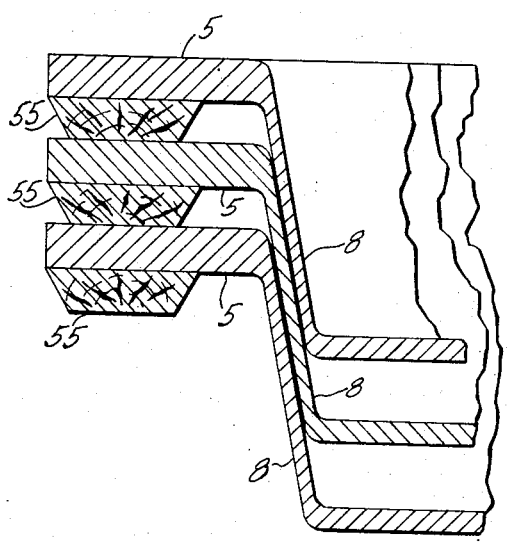
FIG. 8 is a fragmentary elevation in section illustrating a plurality of stacked pallets.

FIG. 8 illustrates the manner in which pallets, according to this invention, may be nested or stacked. As shown in this figure, each pallet 5 is provided with reinforcing strips 55 which have two advantages. Generally speaking, such reinforcing strips materially stiffen the pallet with economical use of stiffening material. The other purpose is that they may be needed to prevent wedging of the sloped side walls of adjacent pallets. A thickness of the strips 55 needed to avoid wedging will need to be greater as the steepness of the side walls 8 approach vertical alignment. Also, the thickness of the strips tends to be proportional to the thickness of the side walls. Hence, there is considerable incentive in achieving compact stacking to design the pallet without severe steepness of the side walls. The angle of the side walls with respect to a perpendicular to the base portion of the pallet or panel is made as large as in consistent with, and does not sacrifice, the loading strength of the bosses. An angle found highly suitable in the twelve-sheet structure described is 11°. On the other hand, the thickness of the reinforcing strips 55 will indicate the permissible steepness of the side walls 8.

Figure 13:
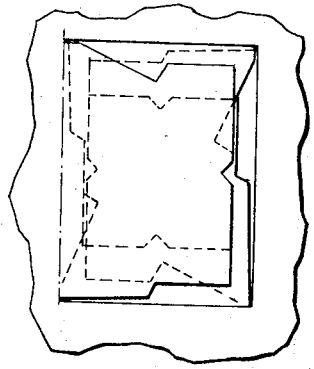
FIG. 13 is a plan view of the tabular areas of FIGS. 9 to 12 placed in superimposed position prior to shaping the tabs into a boss.
Figure 10:
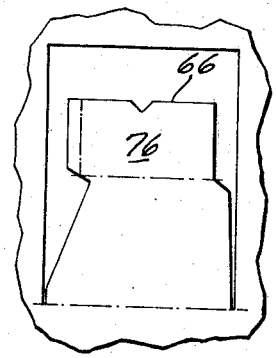
Figure 11:
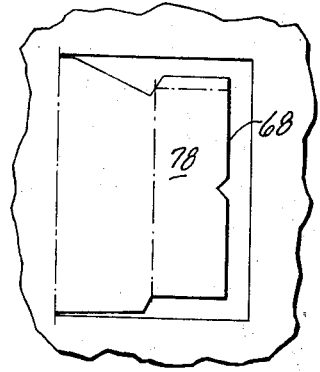
Figure 14:
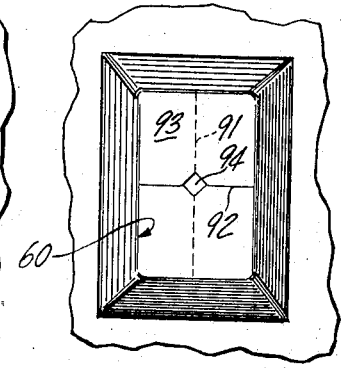
FIG. 14 is a fragmentary plan view of the pallet boss formed by the tabular areas of FIGS. 9 to 13.

FIGS. 9 to 13 illustrate a modified embodiment of the invention resulting in a boss 60 shown in plan view in FIG. 14 in which the viewer looks into the central interior depression of the cavity in the boss. As compared with FIGS. 1 to 6 which illustrate the construction of a boss having a square perimeter at its base permitting all tabs entering into its construction to be of identical cut, the present embodiment is illustrative of the changes in tab shape necessary to accommodate the construction of the boss when the length is greater than the width.

In comparing tabs 65 and 66 with tabs 67 and 68, respective side wall sections change in width in accordance with the dimension of the corresponding boss side within the base perimeter of the boss. The cap-wall sections 75, 76, 77, and 78 undergo the most change. They not only change in accordance with change in width of associated side wall sections but they have lengths in proportion to the two respective cap-wall dimensions with which the cap-wall sections are parallel.

A further modification, evident from FIG. 14, is that the cap-wall section of the tabs in FIGS. 9 to 12 meet along center lines 91 and 92 of the cap-wall in an adhesive joint. This results in the cap-wall 93 being of generally uniform thickness except for a central opening 94 and thus, should be inherently somewhat stronger than the cap-wall of FIG. 6 wherein the distal ends of the tabs are sufficiently short to provide the hole 34 and less material along the center lines of the cap-wall. The hole 94 of the boss 60 is obtained by notching the tabs as at 96 and 97 in FIGS. 9 and 12, respectively. Otherwise, the same principles of construction are used in superimposing the sheet areas represented by FIGS. 9 to 12 into an assembly of superimposed sheets illustrated by FIG. 13. Thereafter, allowing the tabs to adjust one over the other between complementary platens into the boss, as shown.

Many sheet materials of thin, flexible nature are suitable for being bonded together in laminated pallet manufacture in accordance with the disclosure above. For example, sheets of metal coated with a thermosetting or thermoplastic adhesive would be suitable. For use with metal sheet, catalyst-activated adhesives, such as epoxy compositions are among preferred adhesives. Among the cheapest materials available for laminating is thin cardboard treated or permeated with a liquid urea-formaldehyde composition. This composition places the sheets in a rather wet, limp condition prior to the forming operation. Just before being shaped, the sheets may be arranged somewhat as shown in FIG. 13. Thereafter, application of heat and pressure by suitable platens achieves the permanent shape and condition of the portion of the pallet formed by the now integrated laminae. Sturdiness and stiffness of construction of the pallet may be augmented by reinforcing strips 55 attached by stapling, riveting, or bonding through use of adhesives.

The last described embodiment is illustrative of the manner in which tabs may be modified to fit the shape of the boss and that the shape of the tabs may be suitably varied to effect construction of frusto-pyramidal bosses of varying shapes and number of sides.

A square, quadrangle or other polygon formed by the cap-wall may be readily divided into isosceles triangles having one side formed by one side of the polygon cap-wall and its two equal sides extending therefrom into its vertex at the center of the cap-wall. By ordinary geometry, the sum of the angles within the vertices of all such isosceles triangles in a cap-wall is 360°. Hence, the angle within the vertex of each isosceles triangle of an equi-sided polygon is 360° divided by the number of sides. As the isosceles triangles equal the entire area of the cap-wall, sections of the cap-wall of greater area than isosceles triangles based on respective second fold lines produce the necessary overlapping of cap-wall sections to obtain bonding areas integralizing the cap-wall sections of a boss into a cap-wall. The same is true in the case of a non-square rectangular cap-wall except e.g., that the vertex angle between the equal sides of each isosceles triangle forming the cap-wall thereof varies according to the length of its side opposite its vertex in respect to, or as a fraction of, the total perimeter of the cap-wall.

The terms and expressions which have been employed are used as terms of description and not of limitation and there is no intention of excluding such equivalents as fall within the scope of the claims.

What is claimed is:

1. A laminated panel including a frusto-pyramidal boss having a plurality of side walls and a substantially flat cap-wall comprising:
   (A) a like plurality of sheets of thin flexible material, each sheet comprising an area having a polygonal boundary similar to corresponding boundaries of the other sheets, each boundary comprising straight portions equal in number to said plurality, and a tab extending within the boundary from one of said straight portions, each area being open between the tab and the remainder of its respective boundary;
   (B) each tab having a first fold-line extending along said one boundary portion of its respective sheet, and a second fold-line in spaced parallel relation with the said first line dividing the tab into a side wall section disposed between said lines, and a cap-wall section including the distal end portion of the tab;
   (C) said fold-lines of each tab extending lengthwise of, and being contained within, the parallel sides of a quadrangle having one pair of parallel sides, its other pair of sides being of equal length, each of the equal sides of the quadrangle having an end connecting with an end of said one boundary portion;
   (D) said sheets, in stacked condition and forming said boss, having said boundaries in substantially superposed corner-to-corner registry with the tab of each sheet disposed with its first fold-line out of superposition with the respective first fold-lines of said other boundaries; to distribute said tabs in all of said side walls and said cap wall, each tab having a portion in overlapping relation with another tab within said boss; and
   (E) adhesive means bonding all portions of said sheets in laminated relation within said panel.

2. A laminated panel having a group of frusto-pyramidal bosses spaced from each other in a predetermined pattern, each boss having a plurality of side walls and a substantially flat cap-wall, said assembly comprising:
   (A) a plurality of sheets of thin flexible material equal in number to that of said side walls; each sheet comprising a number of areas equal to that of said group corresponding in arrangement to said patterns, each area having a polygonal boundary surrounded by said sheet material similar to the boundaries of the other areas;
   (B) said sheets having respective said boundaries arranged identically with respect to said pattern, a stack of said sheets having a plurality of superposed boundaries equal in number to said plurality for each boss to be formed wherein each boundary of a sheet is in superposed corner-to-corner registry with a boundary of each of the other sheets;
   (C) each boundary having straight portions equal in number to said plurality, and a tab extending within the boundary from one of said straight portions with the respective area being open between the tab and the remainder of its boundary;

(D) said one boundary portion being one of two parallel sides of a quadrangle having another pair of equal sides and containing a first fold-line of said tab, the other parallel side of the quadrangle containing a second fold-line dividing the tab into a side wall section disposed between said fold-lines, and a cap-wall section including the distal end of the tab;

(E) the tabs project inwardly of each plurality of superposed boundaries extending inwardly with respect to all straight portions thereof; and to distribute said tabs in all of said side walls and said cap wall of each boss, each tab having a portion in overlapping relation with another tab within its respective boss; and (F) adhesive means bonding all portions of said sheets in laminated relation within said panel.

3. The assembly of claim 2 wherein:
each sheet has its tabs projecting from respective first fold-lines in parallel directions toward the same side of the sheet, the tabs of each sheet in said stack projecting in a direction relative to the stack different from that of the tabs in said other sheets.

4. The assembly of claim 2 wherein:
(A) said plurality of sheets is double the number of said side walls, said sheets being divided into two groups of which the side wall section of each tab extends in a direction parallel to the fold-lines to provide a marginal portion outside the quadrangle; and
(B) the tabs of one group are reversely shaped with respect to the tabs of the other group to dispose the marginal portions of two superposed tabs on opposite sides of the respective superposed quadrangles.

5. A laminated panel having a base plane portion and a group of hollow frusto-pyramidal bosses spaced one from the other and projecting from the base plane portion in a desired pattern, each boss defined by a cap-wall spaced from the base plane portion, and a plurality of side walls extending from a base plane of the panel into joined relation with the perimeter of the cap-wall, the panel comprising:

(A) a plurality of sheets of thin flexible material equal in number to said plurality disposed in stacked laminae-forming relationship, each sheet comprising a number of areas equal to that of said group and corresponding in arrangement to said pattern, each area having a polygonal boundary surrounded by said sheet material similar to the boundaries of other areas;

(B) said sheets having identical arrangements of boundaries in accordance with said pattern to dispose each boundary of a sheet in approximately superposed corner-to-corner registry with the boundary of the other sheets;

(C) each boundary having straight portions equal in number to said plurality along which the respective area is open except for one portion, and a tab extending from said one portion into one of said side walls and the cap-wall of one of said bosses;

(D) said one boundary portion being one of two parallel sides of a quadrangle having another pair of equal sides, said quadrangle conforming generally to the perimeter of said side wall, said tab having a first fold-line along said one boundary portion, and a second fold-line within the length of the other parallel side dividing the tab into a side wall section between the fold-lines, and a cap-wall section including the distal end of the tab; and (E) each boss having respective first fold-lines of superposed boundaries in substantially perimetrically continuous relation with the boss at approximately said plane to distribute the tabs thereof in all of the side walls and the cap wall of the boss, each tab having its cap wall section overlapping the cap wall section of another tab within said boss; and (F) adhesive means bonding all portions of said sheets in laminated relation within said panel.

6. The panel of claim 5 wherein:
said one boundary portion is coextensive with the larger parallel side of said quadrangle.

7. The panel of claim 5 wherein:
said one boundary portion, the longer of the parallel sides of said quadrangle, and said first fold-line are coextensive.

8. The panel of claim 7 wherein:
the second fold-line is coextensive with the shorter of the parallel sides of the quadrangle.

9. The panel of claim 5 wherein:
each side wall of a boss faces in a direction parallel to that in which a wall of each of the other bosses face, and each sheet has its tabs disposed in said walls facing in parallel directions with the tabs of the other sheets of said plurality disposed in each of the other side walls of each boss.

10. The panel of claim 5 wherein:
the area of the side wall section of each tab extends in a direction parallel to said fold-lines beyond said equal sides of said quadrangle to partially dispose the side wall section within two adjacent side walls of a respective boss and form a connection therebetween, and the cap-wall section extends in a dircetion parallel to the second fold-line outwardly of an isosceles triangle in which the second fold-line is the side opposite the vertex of the triangle at the center of the cap-wall to dispose a portion of said cap-wall section in overlapping relation with another cap-wall section of said boss.

11. The panel of claim 10 wherein:
the dimension of the cap-wall section perpendicular to the second fold-line is less than half the distance between the second fold-line and said vertex to provide a central opening in the cap-wall of said boss.

12. A laminated panel having a group of hollow frusto-pyramidal bosses spaced one from the other, each boss defined by a rectangular cap-wall and four side walls extending from a base plane of the panel into joined relation with the perimeter of the cap-wall, the panel comprising:

(A) eight sheets of thin flexible material disposed in stacked laminae-forming relationship, each sheet comprising a number of areas equal to that of said group and corresponding in arrangement to said pattern, each area having a boundary of four straight portions surrounded by said sheet material similar to the boundaries of the other areas;

(B) said sheets having identical arrangements of boundaries in accordance with said pattern to dispose each boundary of a sheet in approximately superposed corner-to-corner registry with a boundary of each of the other sheets;

(C) each boundary having a tab extending from one of said boundary portions and being open along the others, the tab extending into one of said side walls and the cap wall of its respective boss;

(D) said one boundary portion being the larger of two parallel sides of a quadrangle having another pair of equal sides, said quadrangle conforming generally to the perimeter of said side wall, said tab having a first fold-line coextensive with said one boundary portion, and a second fold-line coextensive with the other of said parallel sides dividing the tab into a side wall section between the fold-lines, and a cap-wall section including the distal end of the tab;

(E) said eight sheets comprising two groups of four sheets, each sheet in each group having respective first fold-lines disposed in the same radial direction from the center of respective boundaries but with respect to a different boundary portion than in the other three sheets of the same group to thereby dispose the first fold-lines of superposed boundaries in substantially perimetrically continuous relation with respect to the boss along said base plane and to dispose two superposed tabs, one from each group, partially in each side wall and partially in the cap-wall of each boss;

(F) each side wall section of a tab extending in a direction parallel to said fold-line beyond said quadrangle to dispose a marginal portion thereof in an adjacent side wall of the respective boss;

(G) the tabs of one group of sheets being reversely shaped with respect to the tabs of the other group to dispose said marginal portions of superposed tabs in both adjacent side walls; and (H) adhesive means bonding all portions of said sheets in laminated relation within said panel.

13. The panel of claim 12 wherein:
the side wall section of each tab is recessed along the side thereof opposite said marginal portion in complementary relation with the tab fitting thereinto from the adjacent side wall.

References Cited
UNITED STATES PATENTS

| | | | |
|---|---|---|---|
| 1,984,653 | 12/1934 | Palmer et al. | 161—131 |
| 2,043,987 | 6/1936 | Brown | 161—131 |
| 3,008,551 | 11/1961 | Cole | 161—110 |

MORRIS SUSSMAN, *Primary Examiner.*